United States Patent

Morrison

Patent Number: 5,861,098
Date of Patent: Jan. 19, 1999

[54] APPARATUS AND METHOD FOR REMOVING GREASE FROM DRAIN WATER IN RESTAURANT OPERATIONS

[75] Inventor: Michael S. Morrison, Tucson, Ariz.

[73] Assignee: MDK Enterprises, Inc., Tucson, Ariz.

[21] Appl. No.: 757,489

[22] Filed: Nov. 27, 1996

[51] Int. Cl.⁶ ..................................................... C02F 1/40
[52] U.S. Cl. .......................... 210/774; 210/776; 210/801; 210/187; 210/519; 210/521; 210/525; 210/540
[58] Field of Search .................................... 210/774, 776, 210/801, 187, 519, 521, 525, 528, 540, 538

[56] References Cited

U.S. PATENT DOCUMENTS

| | | | |
|---|---|---|---|
| 748,981 | 1/1904 | Oliver | 210/540 |
| 3,529,728 | 9/1970 | Middelbeek et al. | 210/540 |
| 4,043,920 | 8/1977 | Woolh | 210/529 |
| 4,102,787 | 7/1978 | Geurtsen | 210/104 |
| 4,396,508 | 8/1983 | Broughton | 210/187 |
| 4,422,931 | 12/1983 | Wolde-Michael | 210/540 |
| 4,886,605 | 12/1989 | Herve | 210/519 |
| 4,983,284 | 1/1991 | Batten | 210/187 |
| 4,994,179 | 2/1991 | Keeter et al. | 210/540 |
| 5,122,280 | 6/1992 | Russell et al. | 210/745 |
| 5,204,000 | 4/1993 | Steadman et al. | 210/519 |
| 5,207,895 | 5/1993 | Basseen et al. | 210/95 |
| 5,254,267 | 10/1993 | Deskins et al. | 210/199 |
| 5,340,477 | 8/1994 | Simon | 210/218 |
| 5,360,555 | 11/1994 | Batten | 210/803 |
| 5,405,538 | 4/1995 | Batten | 210/744 |
| 5,423,986 | 6/1995 | Valentin | 210/519 |
| 5,445,730 | 8/1995 | Pattee | 210/167 |
| 5,451,330 | 9/1995 | Garrett | 210/776 |
| 5,492,619 | 2/1996 | Batten | 210/86 |
| 5,500,132 | 3/1996 | Elmi | 210/540 |
| 5,520,825 | 5/1996 | Rice | 210/540 |
| 5,637,234 | 6/1997 | McCasland | 210/519 |

Primary Examiner—Christopher Upton
Attorney, Agent, or Firm—Antonio R. Durando

[57] ABSTRACT

An apparatus and a method for separating a light liquid from a heavy liquid in a mixture of these liquids are provided which enhance the gravitational separation of such liquids. Thus, water laden with greases such as from a commercial kitchen is contemplated to be substantially rid of the greases by the present apparatus and method. The apparatus comprises a separation chamber; an inlet port; an exit port for each of the light and heavy liquids, with the exit for the light liquid being positioned at about the fluid level of the mixture of liquids; a level control for maintaining the fluid level; and a heater element to heat the mixture, thereby decreasing the viscosity of the light liquid and further driving its separation from the heavier components of the mixture. In the preferred practice of the invention, a skimmer and a series of fluid flow obstacles are also employed along with the heater element to achieve optimal separation.

25 Claims, 4 Drawing Sheets

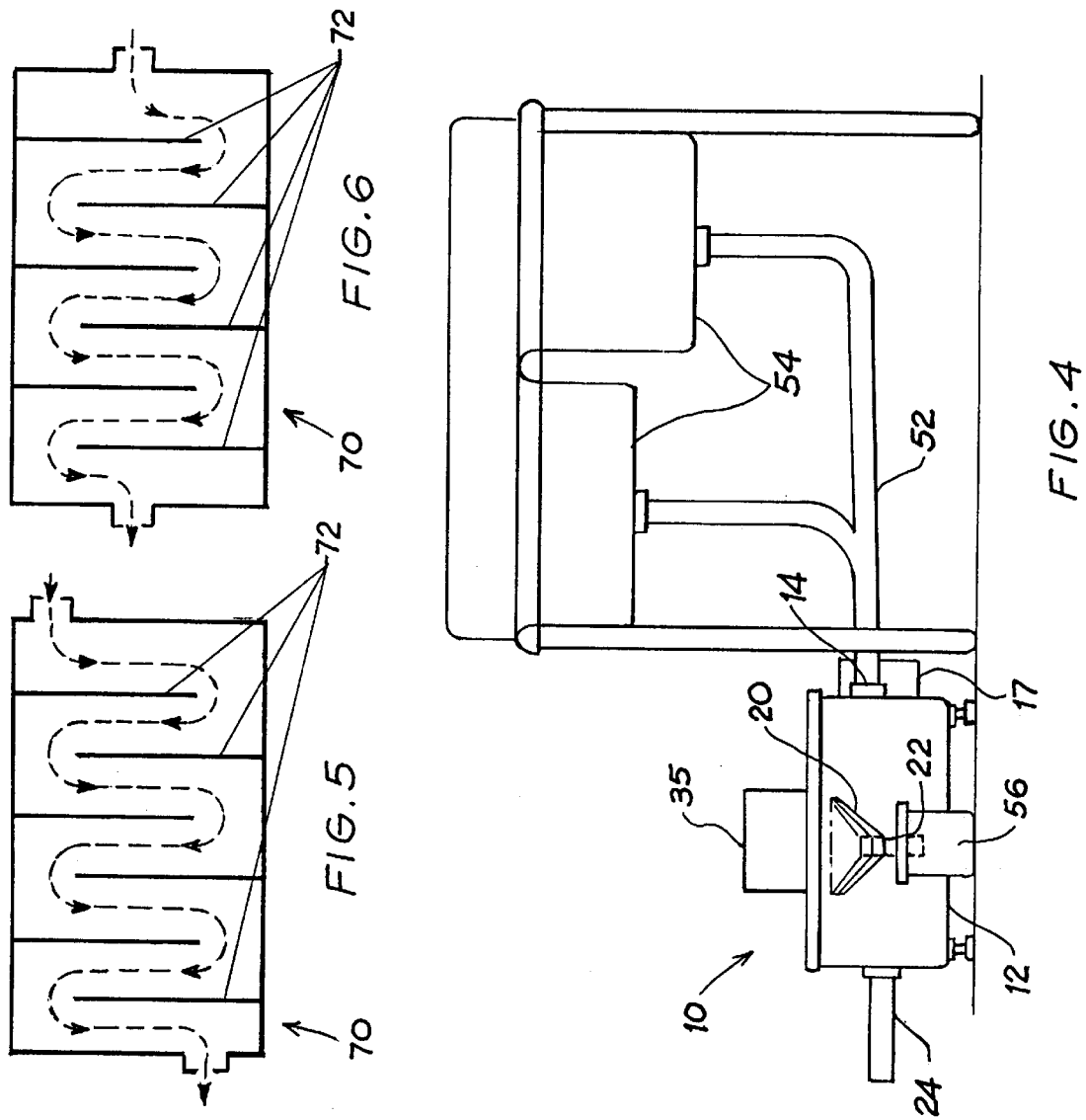

APPARATUS AND METHOD FOR REMOVING GREASE FROM DRAIN WATER IN RESTAURANT OPERATIONS

BACKGROUND OF THE INVENTION

1. Field of the Invention

The invention relates to the separation of liquid components having different specific gravities contained in a single feed stream, and more particularly, relates to an apparatus and method for removing fats, oils, greases and the like from wastewater.

2. Description of the Prior Art

Restaurant kitchens generate wastewater streams containing a number of components aside from water, such as oils, greases, and food waste solids. Such wastewater is typically not suitable for transport directly to a sewage plant because of the presence of oils and greases. Specifically, these greasy wastes interfere with the proper operation of the sewage treatment process by, for example, coating the insides of the pipes and tank walls used to transport and store the sludge and scum from wastewater. Further, excessive amounts of grease may plug the trickling filters or coat the biological floc used in the activated sludge processes of typical wastewater treatment plants. Consequently, many local codes require the removal of oils and greases from wastewater prior to transport to the treatment plants.

Oil/grease separators are known which are capable of separating immiscible liquids having different specific gravities. In general, the separators operate by providing sufficient opportunity for gravity to separate the liquids, such that the heavier liquid sinks and the lighter liquid rises. Descriptions of known oil/grease separators follow.

U.S. Pat. No. 4,102,787, issued to Geurtsen and assigned on its face to Machinefabriek Geurtsen Deventer, B. V., discloses an apparatus for separating a mixture of liquids of different specific gravities (such as oil and water). The Geurtsen apparatus comprises a separation chamber into which a liquid mixture is introduced and a series of filters provided below the separation chamber which allows passage of the heavier liquid to the substantial exclusion of the lighter liquid, with the heavier liquid being collected in a chamber for disposal. The primary inventive feature of the Geurtsen apparatus is a movable wall portion for controlling the discharge of lighter liquid therefrom. This apparatus contains essentially no means for enhancing the separation of liquids, but rather depends solely upon gravitational forces to achieve separation.

U.S. Pat. No. 5,122,280, issued to Russell et al. and assigned on its face to Protectaire Systems, Co., discloses a method and apparatus for separating oil from oil/water mixtures comprising a holding tank that discharges to a separation tank, with the outflow to the separation tank being directed underneath a surface underflow weir, after which the light liquid rises and is collected. Here again, the separation between the liquids is accomplished primarily on the basis of gravitational forces.

U.S. Pat. No. 5,207,895, issued to Basseen et al. and assigned on its face to Pioneer Air Systems, Inc., discloses an oil/water separator that includes vertical columns of coalescing media to enhance separation of the two liquid phases. Movement through the separator is effected by the incoming pressure of the air/oil/water mixture. While the Basseen et al apparatus purportedly effectively removes the majority of oil from a waste stream, the amount of time required to pass through columns of solid media is disadvantageous. Moreover, one is faced with the task of rejuvenating the columns after use.

U.S. Pat. No. 5,254,267, issued to Deskins et al., discloses a grease separation system which has a plurality of filters through which the grease-laden liquid mixture must pass, with the filters being situated above a bed of grease absorbing material which discharges to a perforated pipe. The separated grease must be collected from the grease-absorbing material and from the filters. This method can be undesirable since one must manually collect and handle grease following the separation process.

U.S. Pat. No. 5,340,477, issued to Simon and assigned on its face to Texaco Inc., discloses a separator apparatus for breaking emulsions formed between hydrocarbon liquid and an aqueous solution. Essentially, the apparatus includes an emulsion tank which receives emulsion near its bottom, such that the lighter component gravitates to the surface and is collected in a trough that encircles the tank by means of a skimming weir. This apparatus does not employ any means other than gravitational forces for achieving the separation of the lighter liquids from the heavier liquids, and may thus require an extended period for adequate separation.

U.S. Pat. No. 5,360,555, issued to Batten and assigned on its face to Clearline Systems, Inc., discloses an oil/grease separation apparatus in which effluent passes through a weir system into a quiescent region, where the effluent resides for sufficient time for the oil/grease to float to the top for collection by a rotating oleophilic disk. The cleaned water passes under a baffle to an outlet chamber. The degree of separation achieved by Batten's apparatus is entirely dependent on gravitational forces.

U.S. Pat. No. 5,423,986, issued to Valentin and assigned on its face to Hans Huber GmbH & Co. KG of Berching, Germany, discloses an apparatus for the removal of clarified wastewater from circular tanks. The apparatus serves to uniformly draw off waste water, rather than separate immiscible liquid phases.

U.S. Pat. No. 5,445,730, issued to Pattee, discloses a grease/oil/water separator containing three tanks to achieve separation: a first separation chamber, a trap tank, and a pump tank. The settling chamber separates out debris from the wastewater; the trap tank separates sludge as well as grease/oil from water by means of gravitational forces encouraged by a diagonal flow path; and the pump tank pumps the grease-separated water through a sand filtering means for further cleaning. The trap tank relies solely upon gravity to achieve separation of the grease from the water, with the cleaned water being removed by a pipe inlet situated near the bottom of the tank. The separator depends entirely upon gravitationally-induced separation of grease/oil and water in the trap tank.

U.S. Pat. No. 5,492,619, issued to Batten and assigned on its face to Clearline Systems, Inc., discloses separator system for separating grease from water that includes a skimmer for collecting grease as well as a detector for detecting the presence of grease in the tank. A heat sink is employed to heat the grease in a grease storage container to prevent solidification of the grease.

Other patents disclose apparatuses and methods for removing one liquid from contact with another after separation of the liquids is achieved in a separator. Examples of such patents are U.S. Pat. Nos. 5,405,538 and 5,451,330. U.S. Pat. No. 5,405,538, issued to Batten and assigned on its face to Clearline Systems, Inc., discloses an apparatus for removing grease from a grease trap separator and transferring the grease to a transfer tank. Thus, the apparatus of Batten '538 primarily relates to the transport of separated grease, not the actual separation of grease from a grease-laden wastewater. U.S. Pat. No. 5,451,330, issued to Garrett and assigned on its face to Advanced Waste Reduction, Inc., discloses a suction skimmer for removing an upper layer of liquid from a vessel. Specifically, the skimmer is contemplated for withdrawing hydrocarbons under substantially laminar flow conditions. The Garrett apparatus itself does not achieve separation of immiscible liquids but simply removes the lighter liquid upon its separation.

The apparatuses and methods described above rely either solely upon gravitational forces to vertically separate immiscible liquids in a vessel according to their respective densities, or in some instances employ a weir system or a skimmer component to advance separation. None of the above-described apparatuses provide any means to hasten and/or improve separation beyond that naturally achieved with gravity, other than mechanical means of directing flow such as weir systems and skimmers.

There remains a need for an apparatus and a method for improving the degree of separation between grease and water contained in wastewater such that a greater percentage of grease is recovered compared by above-described apparatuses. The apparatus and method must be efficient and reliable, and must require only a minimal amount of maintenance.

SUMMARY OF THE INVENTION

Accordingly, an apparatus and a method for separating a light liquid from a heavy liquid in a mixture of these liquids are provided which enhance the gravitational separation of such liquids by heating the mixture. Specifically, the apparatus comprises the following components:

a. a separation chamber for receiving the liquid mixture, with the separation chamber being defined by a plurality of walls and a bottom;

b. an inlet section of the separation chamber, with the inlet section comprising an inlet port defined by a first wall of the separation chamber for introducing the liquid mixture into the separation chamber;

c. a level control for maintaining a pre-selected fluid level of the liquid mixture in the separation chamber;

d. a discharge section of the separation chamber, with the discharge section including a first exit port defined by a second wall of the separation chamber for removing the light liquid from the separation chamber, the first exit port being positioned near the top of the second wall;

e. a downstream section of the separation chamber, with the downstream section including a second exit port defined by a third wall of the separation chamber for removing the heavy liquid from the separation chamber; and f. a heater element associated with the separation chamber, the heater element being capable of heating the mixture contained in the separation chamber.

The heater element serves to heat the entire liquid mixture residing in the separation chamber. By heating the mixture, the separation of the light and heavy liquids is believed to be enhanced in two ways. One, the viscosity of the light liquid is decreased so that it more readily migrates to the surface of the mixture and is more easily discharged through the first exit port. Second, heating the mixture will typically decrease the density of the light liquid more than the density of the heavy liquid, such that physical separation by gravity is made more effective by increasing the density differential.

It is contemplated that the present apparatus and method will be employed, among other uses, for separating fats, oils, grease, and other high molecular-weight fatty acids from water, such as wastewater drained from restaurant sinks. The present method is sufficiently effective that the water so cleaned may be directly discharged to conventional sewers in an environmentally-safe manner in compliance with typical local codes. The oil and grease removed from the wastewater is held in a convenient storage vessel for ultimate disposal.

In addition to improved efficiency in separating oil and grease from wastewater, the present apparatus advantageously requires minimal maintenance and handling during operation. Thus, the present apparatus and method offer improved efficiency without sacrificing the simplicity of a gravity-based separation system.

BRIEF DESCRIPTION OF THE DRAWINGS

FIG. 4 is the front elevational view of the apparatus of the preceding figures as it is contemplated for commercial installation in a restaurant kitchen; and FIGS. 5 and 6 are schematics of the side elevation and top plan view, respectively, of a prior art grease trap described in the Example below.

DETAILED DESCRIPTION OF THE INVENTION

The present apparatus and method are useful for the improved separation of a liquid having a lighter specific gravity from a second liquid having a higher specific gravity. Herein, the term "liquid" is used in its normal sense to encompass non-solid materials and includes relatively viscous materials such as oils of various types, dissolved or suspended greases and the like. It is specifically contemplated that the invention will be useful in achieving the separation of grease from water with regard to wastewater issuing from commercial kitchen sinks. However, it will be apparent to those of skill in the art that the apparatus and method described herein are equally applicable to separating other types of mixtures of light and heavy liquids besides oil and water, e.g., a mixture of two mutually-immiscible organic chemicals having sufficiently different specific gravities.

The basic premise of the method of the invention is the enhancement of gravitational separation by heating the mixture and, optionally and preferably, providing skimming and increasing residence time in the settling tank. The gravitational separation of immiscible liquids of different densities is known and has been capitalized upon in the prior art apparatuses described above. Essentially, when two immiscible liquids of different densities are present in a holding tank or separation chamber, the lighter liquid "floats" on top of the heavier, denser, liquid. Accordingly, when a mixture of grease and water has sufficient residence time in a tank, the grease, as the lighter liquid, will form a layer on top of the water. Such has been the premise of many apparatuses in the prior art. As used herein, the term "grease" encompasses oil and other lighter-than-water liquids.

Here, the improved apparatus incorporates a heater element into the settling chamber to enhance the separation achieved by gravity alone. Without subscribing to any particular theory, it is believed that by heating the mixture of liquids, one effects two desirable consequences in the separation thereof: (1) the viscosity of the lighter liquid is decreased, better enabling it to migrate to the surface as well as to be removed from the surface; and (2) the density of grease is decreased to a greater extent than is water when heated, thereby enhancing the differential in densities to the benefit of gravitational separation. Regardless of the correctness of these theories, the separation achieved by the present apparatus is superior to that in the prior art.

In addition to the heater component, the apparatus of the invention preferably employs a skimmer component and fluid flow obstacles to improve separation, with the latter increasing residency time in the settling tank. These and other features of the invention are discussed below.

Figure 1:
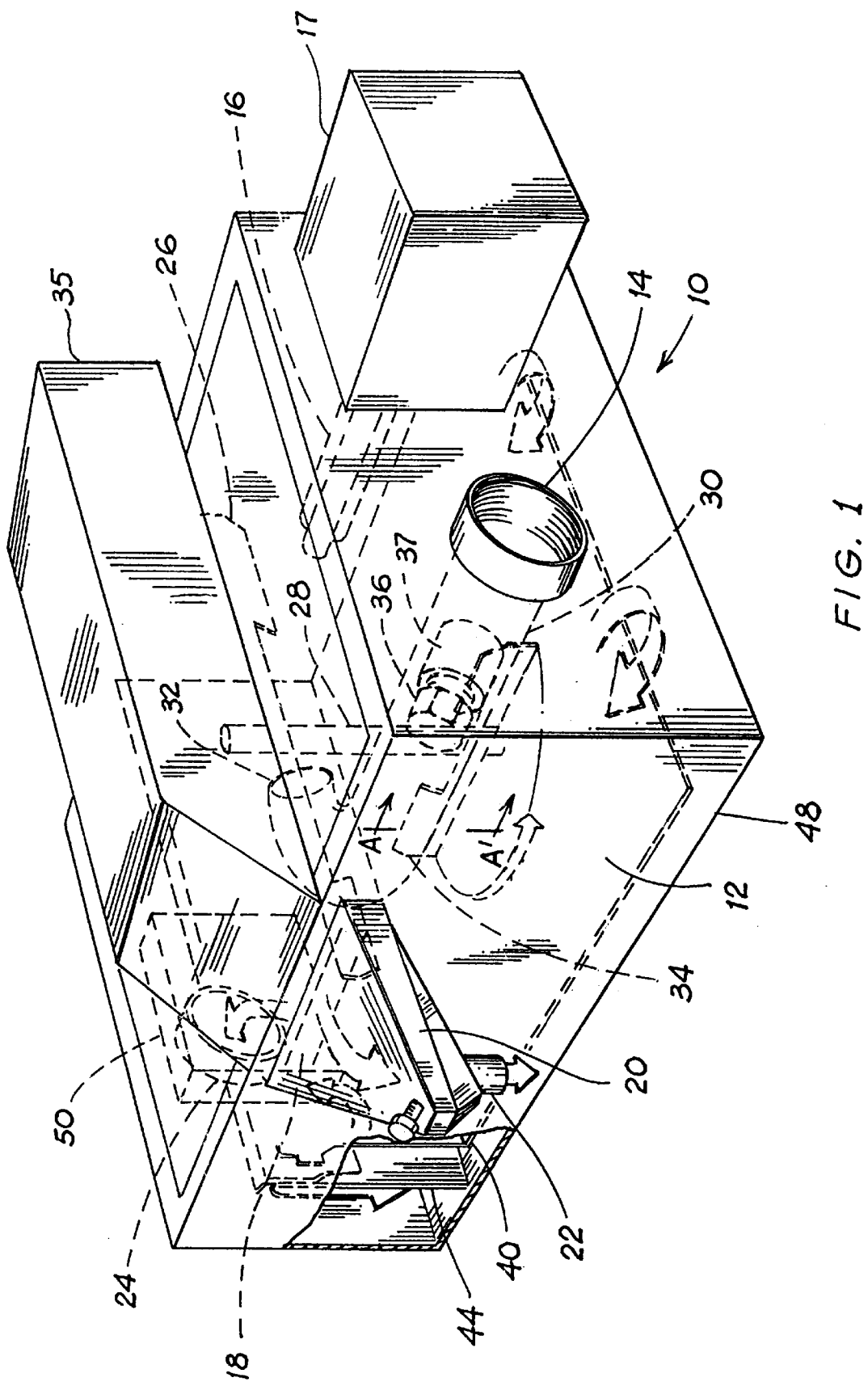
FIG. 1 is a schematic perspective view of an apparatus within the scope of the invention, illustrating various aspects thereof.

Referring now to the drawings, in which like numbers represent like parts throughout the several views, FIG. 1 is a perspective view of an apparatus 10 for separating grease from water. The separation chamber 12 of the preferred embodiment contains the mixture of at least two liquids (such as grease and water), providing the residence time for the grease to rise to the top of the mixture for collection. While the separation chamber 12 of the preferred embodiment as illustrated in the Figures has a generally rectangular form, other configurations may be employed.

The mixture is introduced into the separation chamber 12 by means of an inlet port 14. Once the mixture is introduced into the separation chamber 12, the heavier liquids sink to the bottom of the fluid mixture while the lighter fluids migrate to the surface of the fluid mixture, all by the natural force of gravity. The separation of the lighter liquids from the heavier liquids is enhanced by heating the mixture during its residence time in the separation chamber 12. The mixture is heated using a heater element 16, which is contemplated to be an immersion water heater within the chamber 12. The heater element 16 is connected to an electric heater 17. An example of a suitable commercially-available immersion heater is the Chromalox® Type CJ Automatic Water Heater. It is contemplated that, in the case of separating grease from water, the temperature of the mixture is optimally kept above about 92° F. (33° C.), typically at about 110° F. (43° C.). However, for maximum efficiency, the heater settings should be changed for different installation grease consistencies.

The lighter liquid that collects at the surface of the liquid mixture in the separation chamber is collected via a discharge port 18. The discharge port 18 is positioned such that it coincides with the approximate top of the fluid level of the liquid mixture in the separation chamber 12. Preferably, the discharge port 18 is in the shape of a slot, and an enclosure 20 is provided for the discharge port 18 on the outside of the separator apparatus 10. The enclosure 20 directs the collected light liquid to a discharge conduit 22, through which the light liquid flows for disposal.

The heavy liquid that sinks to the bottom of the separator chamber 12 is allowed to flow out of the separation chamber 12 through an outlet port 24. The separation achieved in the practice of the invention is sufficient such that water that was formerly laden with grease may be discharged directly to sewage lines upon emerging from the separator apparatus 10.

In the preferred embodiment of the invention, a skimmer 26 is employed to sweep in the direction of the discharge port 18 the top layer of grease, or light liquid, that migrates to the top of the mixture of liquids. The skimmer 26 is contemplated to be in the form of a slow-moving rotating blade (or blades, two collinear ones being preferred) that rotates in the top portion of the fluid level of the mixture in the separation chamber 12. The length of the blades is preferably pre-selected such that their tips actually protrude through the discharge port 18, which is preferably a slot, as described above.

Figure 2:
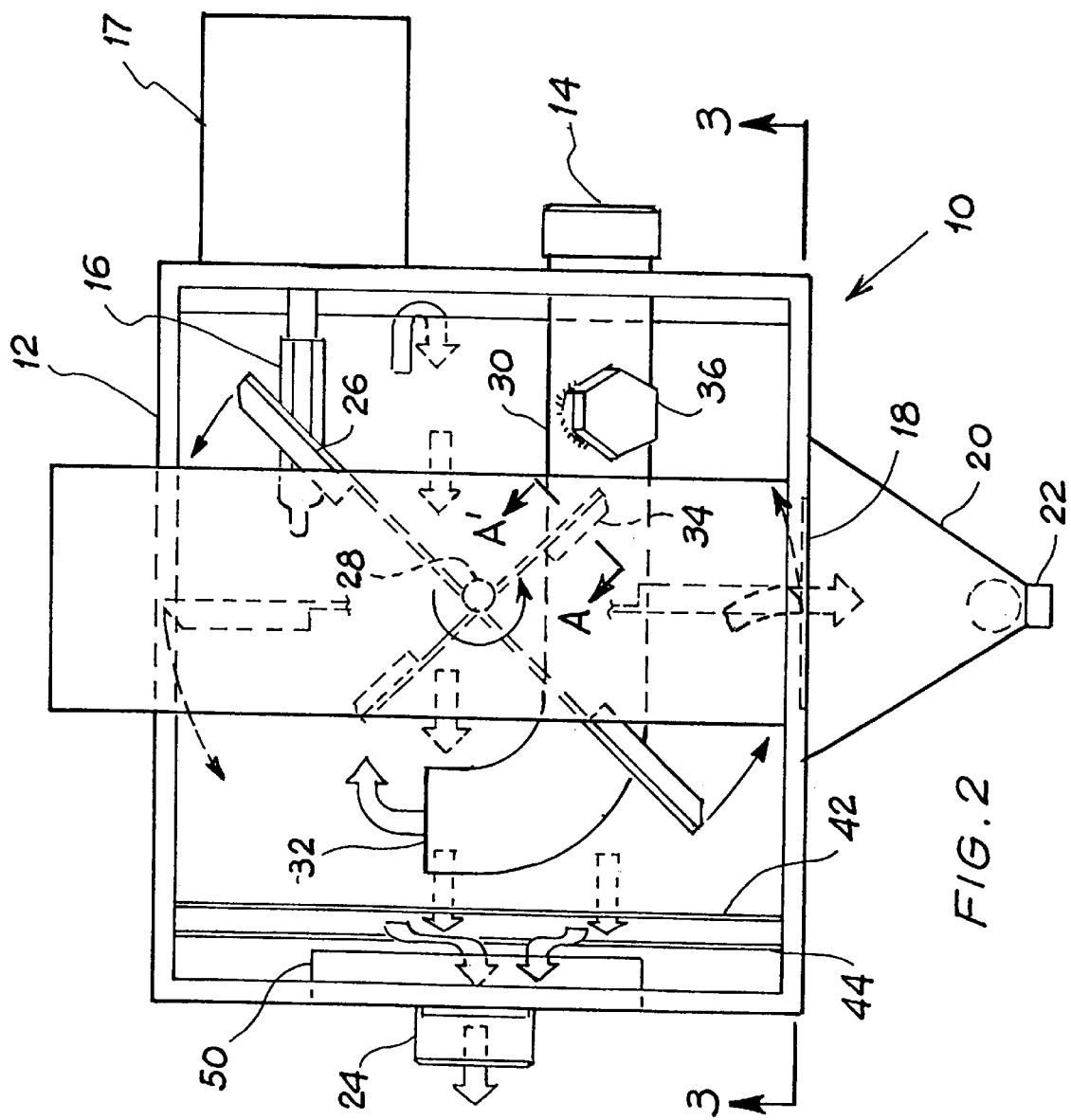
FIG. 2 is the top plan view of the fluid flow schematic for the apparatus of FIG. 1.
Figure 3:
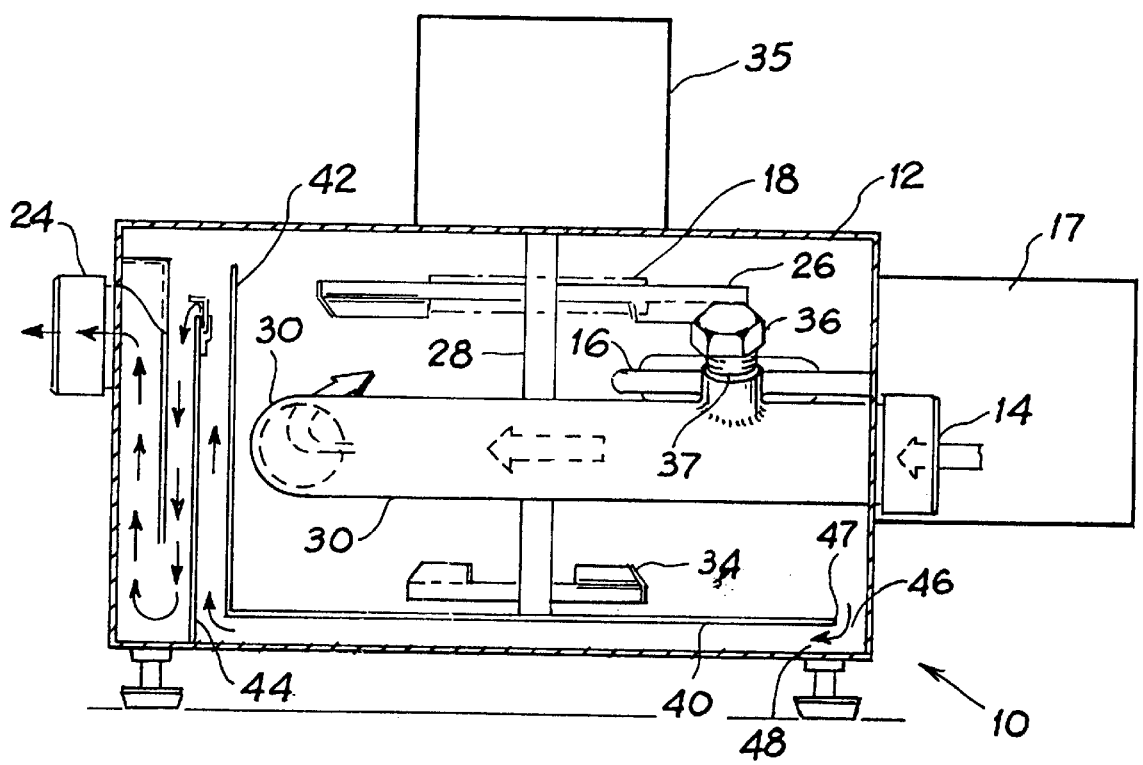
FIG. 3 is the front elevational view of the fluid flow schematic apparatus of the preceding figures.

It would be desirable to introduce the fluid mixture into the separation chamber 12 in such a way that creates additional turbulence in the fluid flow pattern established by the skimmer 26, as opposed to introducing a fluid mixture such that it is swept along with the skimmed grease directly toward the discharge port 18 before having time to separate. Therefore, it is preferable to provide an inlet conduit 30 to introduce the fluid mixture at an optimal point within the internals of the separator chamber 12. In order to produce turbulence, assuming a counterclockwise rotation of the skimmer 26, the inlet conduit 30 would be curved as depicted in FIG. 2, with the discharge end 32 of the conduit 30 positioned to release incoming liquid mixture against the direction of the fluid flow path created by the skimmer 26. FIG. 3 illustrates the preferred elevational position of the discharge end 32 in relation to the skimmer 26.

It is contemplated that the skimmer 26 will be connected to a central shaft 28 that will rotate the skimmer 26. The central shaft 28 is powered by a motor and fan assembly (not shown) contained in housing 35, as shown in FIG. 3. An example of a suitable motor that is commercially available is Dayton's Maxi-Torq™ Gearmotor, although the motor is not so limited.

Figure 1A:
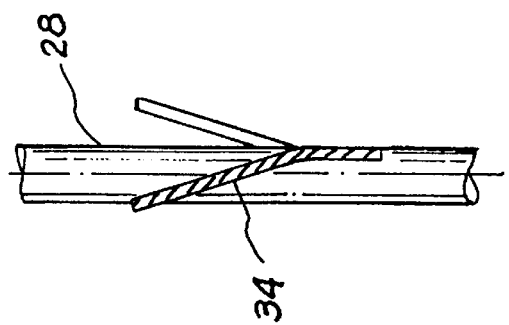
FIG. 1A is an elevation view of the bottom blade in cross section, taken across the line A–A' as indicated in FIGS. 1 and 2.

A second blade or blades 34 is preferably attached to the central shaft 28 to rotate at the bottom of the liquid mixture, with the speed of rotation contemplated to be on the order of about 3 to 12 rpm. The bottom blade 34 serves to stir up any solids that may have settled near the bottom of the liquid mixture so that such solids are retained in the heavy liquids and thus are similarly discharged through the water outlet port 24. Therefore, the bottom blade 34 will have been beveled as illustrated in FIG. 1A to achieve turbulence and upward fluid flow in the mixture.

With further regard to solids, a strainer (not shown) is preferably employed to filter relatively large solid particles out of the liquid mixture before it is introduced into the separator apparatus 10. In the preferred embodiment, the strainer would be installed in front of the inlet port 14, with the strainer having a metal mesh design with about ⅛-inch perforations.

The separator apparatus 10 is designed such that an approximate constant fluid level is maintained, such that the skimmer 26 continuously sweeps the top layer of the liquid mixture toward the discharge port 18. A flow control fixture 36 is employed to try and maintain a constant fluid level by adjusting the opening of the inlet port 14 to approximately meet the discharge requirements of the drainage system to which the apparatus 10 is connected. Essentially, the flow control fixture 36 consists of a valve 37 in the inlet conduit 30 to either open or close, depending on whether more liquid mixture is required to maintain a pre-selected fluid level in line with the position of the skimmer 26 and the discharge port 18. The fluid level control system employed in the practice of the invention is not limited to any particular type. A pump (not shown) operated in conjunction with the open valve 37 to pump water into the separation chamber 12 may be used, if necessary, or the apparatus may be connected directly to the discharge of a drainage system. A liquid-level switch, not shown in the Figures, may be used to turn off the pump (and the heater 17) when the level of the liquid in the chamber 12 is below a predetermined height.

In order to further improve the liquid separation achieved in the practice of the invention, the separator chamber is provided with a tortuous flow path for the heavy liquid to follow before being discharged through the outlet port 24. Specifically, a series of fluid flow obstacles is provided in the preferred embodiment to increase the residence time of the liquid mixture in the separation chamber 12 to allow more complete separation of the liquids.

In the preferred embodiment illustrated in FIG. 3, the fluid flow obstacles employed include a false bottom 40, a baffle 42, and an adjustable weir 44, although the specific design or combination of the fluid flow obstacles is not so limited. The flow characteristics of the liquid mixture in the preferred practice of the invention are illustrated in FIG. 4 by the dashed arrows.

In the preferred embodiment, the baffle 42 spans the entire width of the separator chamber 12 and extends from the false bottom 40 to above the fluid level. The false bottom 40 is preferably positioned to meet the baffle 42 at an approximately 90° angle, thereby preventing the flow of liquid mixture directly from the inlet port 14 or inlet conduit discharge 32 to the outlet port 24. Rather, the false bottom 40 defines an opening 46 between the edge of the false bottom and the wall containing the inlet port 14 that leads to a passageway 48 beneath the false bottom 40 for the heavy liquids.

Once the heavy liquids advance through the passageway 48, the heavy liquids must span the adjustable weir 44 before reaching the outlet port 24. The weir is adjusted in accordance with the fluid level in the separation chamber 12. In the preferred embodiment, the heavy fluids successfully spanning the weir 44 are then discharged through the outlet port 24. An outlet trap 50 is provided at the outlet port 24 to prevent the heavy liquids from backflowing into the chamber 12. Thus, the heavy liquid is able to leave the separation chamber 10 only after flowing laterally through a false bottom 40, upwardly past a baffle 42, downwardly past a weir 44, and finally through a trap 50 to reach the outlet port 24. The heavy liquids so discharged after separation in the separation apparatus 10 are sufficiently clean to be disposed in the sewer lines.

The separation apparatus 10 is contemplated to clean approximately 24 to 36 gallons per minute of wastewater from a commercial kitchen environment. It is noted that to achieve optimal separation capabilities, the separation chamber 12 must be sized appropriately. In its preferred embodiment, the separation chamber 12 is made of 304 stainless steel and is sized to hold about 9 gallons of liquid; and the outlet port 24 is about 4 inches below the discharge port 18 (skimmer level).

The separation apparatus 10 is contemplated to be used in commercial kitchens to remove grease and oils from sink wastewater. FIG. 4 illustrates how the unit 10 may be installed in a commercial kitchen setting. Specifically, a pipe 52 is run from the kitchen sink 54 to the inlet port 14, thereby delivering gray water containing grease and oils to the separator apparatus 10 for cleaning prior to disposal in the sewer lines. The grease and oils are collected in a grease container 56, which may be conveniently emptied and the contents disposed of in accordance with local regulation. Alternatively, the grease container 56 may be a sealable drum that is itself disposable in accordance with local regulation.

At any rate, the apparatus 10 of the invention does not require workers to manually collect grease from filters nor does it require extensive maintenance. Rather, it is contemplated that the present apparatus 10 requires only routine flushing with clean water.

The benefits achieved in the practice of the invention are illustrated in the Example below.

EXAMPLE

A comparison was made between the effectiveness of a prior art grease trap and the present apparatus in cleaning grease-laden water from a working restaurant kitchen sink delivered at a rate of about 32 gallons per minute. The wastewater from the kitchen sink later connected to the grease trap and the present apparatus had an untreated oil and grease concentration of 2,500 to 3,000 mg/L, which was measured gravimetrically. When necessary, the grease content was controlled by adding grease previously separated from the same source.

A schematic of the elevation and top plan views of the prior art grease trap 70 are presented as FIGS. 5 and 6, respectively. Essentially, the prior art grease trap employed in this example consisted of a series of baffles 72 in which grease was collected as the wastewater flowed through the trap. It is noted that, in the operation of such a grease trap 70, the grease must be periodically and routinely collected from the grease trap by hand; if the grease is allowed to build up in such a grease trap, it is thereafter unable to effectively remove grease from wastewater.

To illustrate the effectiveness of the present apparatus in removing grease from kitchen wastewater, a conventional grease trap 70 (40-lb capacity) and the present apparatus were alternatively connected to the same kitchen sink (not shown) in a working restaurant. Specifically, the present apparatus as depicted in FIG. 1 was connected to the kitchen sink in a similar fashion to that depicted in FIG. 4. As measured gravimetrically, the following results were obtained:

TABLE 1

Comparison of the Effectiveness of a Grease Trap and the Present Apparatus in Removing Oil and Grease Restaurant Wastewater.

| Apparatus | mg/L, before treatment | mg/L, after treatment |
|---|---|---|
| Prior Art Grease Trap | 2,650 | 620 |
| Present Apparatus | 2,650 | 15 |

Therefore, it has been demonstrated that an apparatus within the scope of the invention is much more effective in removing oils and greases from wastewater than a prior art grease trap. Further, the present apparatus is superior to the prior art grease trap in convenience, since it does not require manual scooping of collected grease.

As understood by one skilled in the art, the material trapped from water drains consists of various grades of grease that are utilized according to their quality and toxicity. In decreasing order of usefulness, the top grade is used in the manufacture of soaps and perfumes, followed by pet-food additives, and lubricants. The lowest-grade grease is discarded because considered too toxic for any commercial use. Inasmuch as grease trapped in conventional grease traps deteriorates as it builds up prior to its removal, the present invention also provides a means for improving the quality of the material separated from drain water because of its continuous operation. In general, the grease obtained from the operation of the device of the invention is all top grade and suitable for the most productive applications.

Thus, there has been disclosed herein an apparatus and a method for separating and removing oils, greases, and the like, from water. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An apparatus to separate grease from water in a mixture of thereof, said apparatus comprising:
   a. a separation chamber for receiving said mixture, said separation chamber being defined by a plurality of walls and a separation chamber bottom;
   b. an inlet section of said separation chamber, said inlet section comprising an inlet port for introducing said mixture into said separation chamber;
   c. a level control for maintaining a pre-selected fluid level of said mixture in said separation chamber;
   d. a discharge section of said separation chamber, said discharge section including a first exit port for removing the grease from said separation chamber, said first exit port being positioned near the top of a wall of the chamber;
   e. a downstream section of said separation chamber, said downstream section including a second exit port in a downstream section of said separation chamber for removing the water from said separation chamber;
   f. a heater element associated with said separation chamber, said heater element being capable of heating said mixture contained in said separation chamber; and
   g. a skimmer suspended in said separation chamber by means of a rotating shaft connected to said separation chamber, said skimmer serving to direct the grease to said first exit port, said skimmer comprising at least one blade capable of moving said mixture of liquids, said skimmer being positioned to rotate in substantially the same plane as said first exit port, said plane being parallel to said fluid level;
   wherein said first exit port comprises a slot and wherein an enclosure connected to the outside of said apparatus encloses said slot, said enclosure being connected to a second conduit through which the grease is discharged.

2. An apparatus to separate a light liquid from a heavy liquid in a mixture of these liquids, said light liquid and said heavy liquid being substantially non-miscible in one another, said apparatus comprising:
   a. a separation chamber for receiving said mixture, said separation chamber being defined by a plurality of walls and a separation chamber bottom;
   b. an inlet section of said separation chamber, said inlet section comprising an inlet port for introducing said mixture into said separation chamber;
   c. a level control for maintaining a pre-selected fluid level of said mixture in said separation chamber;
   d. a discharge section of said separation chamber, said discharge section including a first exit port for removing said light liquid from said separation chamber, said first exit port being positioned near the top of a wall of the chamber;
   e. a downstream section of said separation chamber, said downstream section including a second exit port in a downstream section of said separation chamber for removing said heavy liquid from said separation chamber;
   f. a heater element associated with said separation chamber, said heater element being capable of heating said mixture contained in said separation chamber; and
   g. a skimmer suspended in said separation chamber by means of a rotating shaft connected to said separation chamber, said skimmer serving to direct said light liquid to said first exit port, said skimmer comprising at least one blade capable of moving said mixture of liquids, said skimmer being positioned to rotate in substantially the same plane as said first exit port, said plane being parallel to said fluid level;
   wherein said first exit port comprises a slot and wherein an enclosure connected to the outside of said apparatus encloses said slot, said enclosure being connected to a second conduit through which said light liquid is discharged.

3. The apparatus of claim 2 wherein said separation chamber is defined by four walls, a bottom, and a top.

4. The apparatus of claim 2 wherein at least two of said first, second, and third walls are one and the same.

5. The apparatus of claim 2 wherein said downstream section is separated from said inlet section by at least one fluid flow obstacle, said at least one fluid flow obstacle serving to further enhance the separation of said light and heavy liquids by increasing the amount of time spent by said mixture in said separation chamber.

6. The apparatus of claim 5 wherein said at least one fluid flow obstacle comprises a baffle and a false bottom of said separation chamber, said baffle being substantially parallel to a wall of said separation chamber containing said inlet section and said false bottom being substantially parallel to said bottom of said separation chamber, said baffle having a bottom above said separation chamber bottom and a top above said fluid level, said false bottom positioned between said baffle and said wall of said separation chamber containing the inlet section and having four edges of which three edges are adjoined to two other walls of said separation chamber and to said bottom of said baffle, with a fourth edge of said false bottom positioned near but not touching said wall containing the inlet section, thereby defining a passageway for said heavy liquid between said wall containing the inlet section and said fourth edge of said false bottom, such that said mixture must flow underneath said false bottom to reach said downstream section from said inlet section.

7. The apparatus of claim 6 wherein said at least one fluid flow obstacle further comprises a weir extending upwardly from said bottom of said separation chamber to an adjustable elevation, said weir positioned substantially parallel to said baffle between said baffle and said second exit port.

8. The apparatus of claim 2 wherein said inlet section further comprises a first conduit, said first conduit having a first end and a second end, said first end being connected to said inlet port and said second end serving to discharge said mixture of liquids into the internals of said separation chamber.

9. The apparatus of claim 8 wherein said conduit is curved, such that said second end discharges said mixture of liquids toward said wall containing the inlet section.

10. The apparatus of claim 2 wherein said at least one blade of said skimmer is sufficiently long such that it extends through said slot, thereby pushing said light liquid through said slot and toward said second conduit.

11. The apparatus of claim 2 wherein said apparatus further comprises an outlet trap on a wall of said separation chamber containing the second exit port, such that said heavy liquids pass through said outlet trap before discharge through said second exit port, said outlet trap serving to limit return of said heavy liquids into said separation chamber.

12. The apparatus of claim 2 wherein said apparatus further comprises an agitating blade suspended near said bottom of said separation chamber inside said separation chamber on a rotating shaft connected to said separation chamber, said agitating blade capable of agitating said mixture such that said mixture flows in an upward direction in said separation chamber.

13. An apparatus to separate a light liquid from a heavy liquid in a mixture of these liquids, said light liquid and said heavy liquid being substantially non-miscible in one another, said apparatus comprising:
  a. a separation chamber for receiving said mixture of liquids, said separation chamber being defined by a four walls, a bottom, and a top;
  b. an inlet section of said separation chamber, said inlet section comprising an inlet port defined by a first wall of said separation chamber for introducing said mixture into said separation chamber, said inlet section further comprising a first conduit having a first end and a second end, said first end being connected to said inlet port and said second end serving to discharge said mixture of liquids inside said separation chamber;
  c. a discharge section of said separation chamber, said discharge section including a first exit port defined as a slot by a second wall of said separation chamber, said first exit port being positioned near the top of said second wall, wherein said first exit port is enclosed on the outside of said apparatus by an enclosure, said enclosure being connected to a second conduit through which said light liquid is discharged from said separation chamber;
  d. a downstream section of said separation chamber, said downstream section including a second exit port defined by a third wall of said separation chamber for removal of said heavy liquid from said separation chamber, said downstream section also including an outlet trap connected to said third wall of said separation chamber to prevent said heavy liquids from returning to said separation chamber once reaching said second exit port;
  e. a heater element associated with said separation chamber, said heater element capable of heating said mixture of liquids contained in said separation chamber;
  f. a skimmer suspended in said separation chamber by means of a rotating shaft connected to said separation chamber, said skimmer serving to direct said light liquid to said first exit port, said skimmer comprising at least one blade capable of moving said mixture of liquids, said skimmer being positioned to rotate in substantially the same plane as said first exit port, said plane being substantially parallel to said fluid level;
  g. an agitating blade suspended near said bottom of said separation chamber inside said separation chamber on said rotating shaft, said agitating blade capable of agitating said mixture such that said mixture flows in an upward direction in said separation chamber;
  h. a level control for controlling the fluid level in said separation chamber; and
  i. a plurality of fluid flow obstacles serving to separate said downstream section from said inlet section, said plurality of fluid flow obstacles including a baffle, a weir, and a false bottom of said separation chamber;

wherein said baffle is substantially parallel to said first wall and has a bottom above said separation chamber bottom and a top above said fluid level; said weir extends upwardly from said bottom of said separation chamber to an adjustable elevation and is positioned substantially parallel to said baffle between said baffle and said second exit port; and wherein said false bottom is substantially parallel to said bottom, is positioned between said baffle and said first wall, and has four edges of which three edges are respectively adjoined to said second wall of said separation chamber, a fourth wall of said separation chamber, and said bottom of said baffle, with a fourth edge of said false bottom positioned near but not touching said first wall, thereby defining a passageway for said heavy liquid between said first wall and said fourth edge of said false bottom, such that said mixture must flow underneath said false bottom to reach said downstream section from said inlet section.

14. A method for separating a light liquid from a heavy liquid in a mixture of these liquids, said light liquid and said heavy liquid being substantially non-miscible in one another, said method comprising the steps of:
  a. providing a separation chamber for holding said mixture, said separation chamber being defined by a plurality of walls and a separation chamber bottom;
  b. flowing said mixture into said separation chamber via an inlet port in an inlet section of said separation chamber;
  c. controlling the amount of said mixture introduced into said separation chamber such that a pre-selected fluid level is substantially maintained within said separation chamber;
  d. heating said mixture in said separation chamber using a heater element contained within the separation chamber, thereby enhancing separation of said substantially non-miscible liquids by increasing the specific gravity differential therebetween and by decreasing the viscosity of said light liquid:
  e. collecting said light liquid floating on top of said heavy liquid in a discharge section of said separation chamber, said discharge section including a first exit port for removing said light liquid from said separation chamber, said first exit port being positioned near the top of a wall;
  f. collecting said heavy liquid in a downstream section of said separation chamber, said downstream section including a second exit port in a downstream section of said separation chamber for removing said heavy liquid from said separation chamber; and
  g. immediately prior to step (e), skimming said light liquid floating on top of said heavy liquid in said separation chamber using a skimmer suspended in said separation chamber by means of a rotating shaft connected to said separation chamber, thereby directing said light liquid to said first exit port for collection in step (e), said skimmer comprising at least one blade and being positioned to rotate in substantially the same plane as said first exit port, said plane being parallel to said fluid level;

wherein said first exit port comprises a slot and wherein an enclosure connected to the outside of said apparatus encloses said slot, said enclosure being connected to a second conduit through which said light liquid is discharged.

15. The method of claim 14 wherein said light liquid is grease and wherein said heavy liquid is water.

16. The method of claim 14 wherein said separation chamber is defined by four walls, a bottom, and a top.

17. The method of claim 14 further comprising the step (d') of increasing the amount of time said heavy liquid resides in said separation chamber prior to collection in step (f) by separating said downstream section from said inlet section with at least one fluid flow obstacle.

18. The method of claim 17 wherein said at least one fluid flow obstacle comprises a baffle and a false bottom of said separation chamber, said baffle being substantially parallel to said wall of said separation chamber containing the inlet section and said false bottom being substantially parallel to said bottom of said separation chamber, said baffle having a bottom above said separation chamber bottom and a top above said fluid level, said false bottom positioned between said baffle and said wall of said separation chamber containing the inlet section and having four edges of which three edges are adjoined to two other walls of said separation chamber and to said bottom of said baffle, with a fourth edge of said false bottom positioned near but not touching said wall containing the inlet section, thereby defining a passageway for said heavy liquid between said wall containing the inlet section and said fourth edge of said false bottom, such that said heavy liquid must flow underneath said false bottom to reach said downstream section from said inlet section.

19. The method of claim 18 wherein said at least one fluid flow obstacle further comprises a weir extending upwardly from said bottom of said separation chamber to an adjustable elevation, said weir positioned substantially parallel to said baffle between said baffle and said second exit port.

20. The method of claim 14 wherein, in step (b), said mixture flows into said separation chamber by means of a first conduit, said first conduit having a first end and a second end, said first end being connected to said inlet port and said second end serving to discharge said mixture of liquids into the internals of said separation chamber.

21. The method of claim 20 wherein said conduit is curved, such that said second end discharges said mixture of liquids toward said wall containing the inlet section.

22. The method of claim 14 wherein said at least one blade of said skimmer is sufficiently long such that it extends through said slot, thereby pushing said light liquid through said slot and toward said second conduit.

23. The method of claim 14 further comprising the step of preventing said heavy liquid from returning to said separation chamber once reaching said second exit port by providing an outlet trap connected to the interior of said separation chamber on a wall containing said second exit port.

24. The method of claim 23 wherein at least two of said first, second, and third walls are one and the same.

25. The method of claim 14 further comprising the step of agitating said mixture in said separation chamber with an agitating blade suspended near said bottom of said separation chamber by means of a rotating shaft connected to said separation chamber, said agitating blade serving to direct flow of said mixture upward in said separation chamber, thereby further increasing the time said heavy liquid resides in said separation chamber.

\* \* \* \* \*